June 23, 1953 N. J. CORNFELD 2,643,301

HAND TELEPHONE

Filed April 11, 1949

INVENTOR.
NATHAN J. CORNFELD
BY M. A. Hayes
Att'y.

Patented June 23, 1953 2,643,301

UNITED STATES PATENT OFFICE 2,643,301

HAND TELEPHONE

Nathan J. Cornfeld, New York, N. Y.

Application April 11, 1949, Serial No. 86,833

1 Claim. (Cl. 179—103)

(Granted under Title 35, U. S. Code (1952), sec. 266)

The present invention relates to hand telephones.

It is an object of the present invention to provide a hand telephone that can be used in conjunction with hearing-aid devices to facilitate the use of telephone apparatus by persons who are hard of hearing.

Another object is to provide a hand telephone that is adapted for use with hearing-aid devices in a manner such that a receiver part of the telephone may be placed adjacent the microphone of the hearing-aid device while the transmitter part of the telephone is adjustably positionable in front of the mouth of the person.

Another object is to provide a hand telephone that is readily convertible from normal mouth-to-ear use to mouth-to-microphone use, and vice versa.

The foregoing and other objects of my invention, together with various features thereof, will appear more fully upon consideration of the following detailed description of the preferred embodiments of the invention taken in connection with the accompanying drawing in which.

Figure 1:
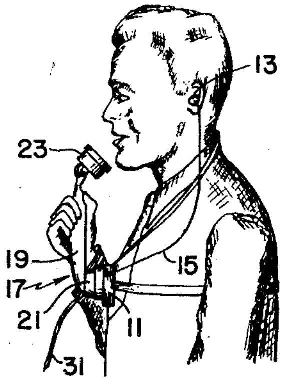
Fig. 1 is a sketch illustrative of a hand telephone constructed in accordance with the teaching of the present invention, and as used by a hard-of-hearing person.

Persons who are hard of hearing are able to hear by means of electronic hearing-aid devices, which in a common form, comprise a unitary pack including a microphone, amplifier and power supply therefor, which pack is adapted to be suspended on the body of the user and positioned on the chest. Normally, such apparatus are worn beneath the outer garments of the user. However, the apparatus are here shown supported over the garments more clearly to illustrate the same, and, in addition to the pack shown at 11, they comprise a fitted ear piece or receiver 13 disposed within the outer ear portion of the user and connected to the pack 11 by means of a conductor 15.

Sound energy picked up by microphone within the pack 11 is converted into electrical energy and amplified by the amplifier contained therein. The amplified electrical energy is conducted to the earpiece 13 where it is reconverted into an amplified version of the sound picker up, and passed directly to the ear of the user.

It is common among hard-of-hearing persons to experience difficulty in hearing by means of ordinary telephones. Furthermore, conventional one-piece hand telephone sets are not readily adapted for use in conjunction with the hearing aids used by such hard of hearing persons. In accordance with the present invention, however, such difficulty is overcome by providing a telephone hand set that is directly usable with the hearing-aid devices to provide improved telephone hearing. Such a handset is generally indicated at 17, and comprises a body or handle portion 19, having at one end a receiver 21 that is arranged substantially at right angles to the body portion 19 and adapted normally to be positioned over the microphone in pack 11. The receiver is preferably provided with a cap or cover 22 of sponge rubber or other resilient material to minimize the noise resulting from contact of the receiver and the garments and/or the case of pack 11.

Rotatably mounted to the other end of the body portion 19 is a transmitter 23. In the embodiment shown in Figs. 2 and 3 the mounting for the transmitter comprises a tab 25 suitably connected to the rear portion of the transmitter 23 and adapted to fit snugly between a pair of spaced tab 27 formed at the adjacent end of the body portion 19. A stud or rivet 29 passes through aligned openings in tabs 25, 27 so that transmitter 23 may be adjustably positioned through a wide range of angular position with respect to the body portion 19.

A cable 31, bearing the usual conductors for energizing the receiver 21 and the transmitter 23, is adapted to be drawn from the telephone 17 through an opening 33 formed in the receiver 21.

Figure 4:
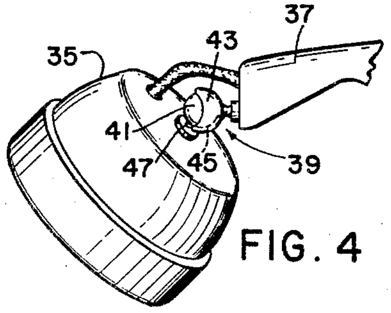
Fig. 4 is a fragmentary view of a modification of the invention.

A modified form of hand telephone is shown in Fig. 4 wherein a transmitter 35 is attached to a body portion 37 by means of a ball and socket coupling 39, comprising a ball 41 fixedly attached, as by stud 47, to the rear part of the transmitter 35, and a hollow socket 43 fixedly attached to the body portion 37. As shown, the socket 43 is slotted as at 45 so as to receive the short stud 47 when the transmitter 25 is adjusted to a position similar to that shown in dotted lines in Fig. 2.

Figure 2:
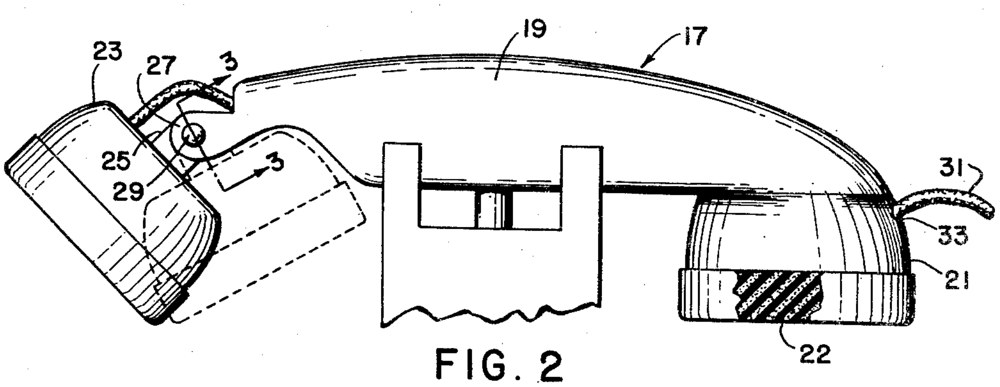
Fig. 2 is an enlarged elevational view of the hand telephone.
Figure 3:
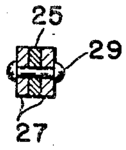
Fig. 3 is a view in cross section taken along the line 3—3 of Fig. 2.

With transmitters 23 and 35 adjusted as shown by the full lines in Figs. 2 and 4, the hand telephone is adapted for use by a hard-of-hearing person and in the manner illustrated in Fig. 1.

The ball and socket mounting of transmitter 35 is useful in case the user of the hearing aid device carries the pack 11 in a side breast pocket, whereupon a slight further adjustment of the transmitter out of the plane defined by the axes of the body part and receiver is sufficient to position the transmitter in front of the mouth for maximum efficiency of operation.

With the transmitter adjusted as shown by dotted lines (Fig. 2) the hand telephone may be used by persons with normal telephone hearing.

If desired, the receiver can also be adjustably mounted on the body part 19, thereby to add to the comfort of the users with or without hearing aids.

There has thus been described a novel hand telephone that is adapted to be used in conjunction with hearing-aid devices to facilitate the use of telephone instruments by hard-of-hearing persons. It is to be understood that many variations may be made in this disclosure without departing from the true scope and spirit of the invention. Accordingly I do not wish to be limited to the details of the specific embodiment but only by the scope of the appended claim.

The invention described herein may be manufactured and used by or for the Government of the United States of America for governmental purposes without the payment of any royalties thereon or therefor.

I claim:

A hand telephone comprising integrally formed handle and receiver portions, a transmitter part, and means rotatably securing said transmitter part to said handle portion comprising ball means affixed rigidly on said transmitter part, and a ball-receiving socket on said handle portion, said ball means being substantially omnidirectionally rotatable in said socket, wherein in one extremal position of said transmitter part a normal to the active face thereof and a normal to the active face of said receiver portion form an acute angle, and wherein said handle is formed with a recessed base to receive said transmitter part when the latter is disposed in said extremal position.

NATHAN J. CORNFELD.

References Cited in the file of this patent

UNITED STATES PATENTS

| Number | Name | Date |
|---|---|---|
| 546,972 | Gerson | Sept. 24, 1895 |
| 839,050 | Turner | Dec. 18, 1906 |
| 854,439 | Strongberg | May 21, 1907 |
| 1,298,771 | Nash et al. | Apr. 1, 1919 |
| 1,340,955 | Herrman | May 25, 1920 |
| 1,558,191 | Lindemann | Oct. 20, 1925 |
| 1,648,832 | Urban | Nov. 8, 1927 |
| 2,121,941 | Wurdel | June 28, 1938 |
| 2,160,829 | Cherry | June 6, 1939 |
| 2,544,027 | King | Mar. 6, 1951 |